(12) United States Patent
Anderson et al.

(10) Patent No.: US 11,003,477 B2
(45) Date of Patent: May 11, 2021

(54) PROVISION OF INPUT/OUTPUT CLASSIFICATION IN A STORAGE SYSTEM

(71) Applicant: Intel Corporation, Santa Clara, CA (US)

(72) Inventors: Andrew Anderson, Forest Grove, OR (US); Yi Zou, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 130 days.

(21) Appl. No.: 16/271,664

(22) Filed: Feb. 8, 2019

(65) Prior Publication Data

US 2019/0188025 A1 Jun. 20, 2019

(51) Int. Cl.
*G06F 9/455* (2018.01)
*G06F 3/06* (2006.01)
*G06F 16/11* (2019.01)
*G06F 12/0862* (2016.01)
*G06F 16/172* (2019.01)

(52) U.S. Cl.
CPC .......... *G06F 9/45558* (2013.01); *G06F 3/061* (2013.01); *G06F 3/067* (2013.01); *G06F 3/0611* (2013.01); *G06F 3/0653* (2013.01); *G06F 9/45533* (2013.01); *G06F 12/0862* (2013.01); *G06F 16/11* (2019.01); *G06F 16/128* (2019.01); *G06F 16/172* (2019.01); *G06F 2009/45579* (2013.01); *G06F 2009/45583* (2013.01); *G06F 2212/602* (2013.01); *G06F 2212/6022* (2013.01); *G06F 2212/6024* (2013.01); *G06F 2212/6026* (2013.01); *G06F 2212/6028* (2013.01); *G06F 2216/13* (2013.01)

(58) Field of Classification Search
None
See application file for complete search history.

(56) References Cited

U.S. PATENT DOCUMENTS

| 2010/0070725 A1* | 3/2010 | Prahlad | G06F 11/1453 711/162 |
| 2015/0263986 A1* | 9/2015 | Park | G06F 3/067 709/226 |
| 2020/0026560 A1* | 1/2020 | Singh | G06F 9/5005 |
| 2020/0036787 A1* | 1/2020 | Gupta | G06F 3/0653 |
| 2020/0065487 A1* | 2/2020 | Timashev | G06F 9/45558 |

* cited by examiner

*Primary Examiner* — Qing Yuan Wu
(74) *Attorney, Agent, or Firm* — Schwabe, Williamson & Wyatt, P.C.

(57) ABSTRACT

Embodiments of the present disclosure are directed towards techniques and configurations for an apparatus configured to provide I/O classification information in a distributed cloud storage system, in accordance with some embodiments. In one embodiment, the apparatus may include a partition scanner, to scan an image of a virtual disk associated with the storage system, to determine one or more partitions associated with the virtual disk; a file system scanner coupled with the partition scanner, to identify file systems associated with the determined partitions, to access files stored in the identified file systems; and I/O classifier coupled with the file system scanner, to generate I/O classification information associated with the accessed files. The I/O classification information provides characteristics of input-output operations performed on the virtual disk. Other embodiments may be described and/or claimed.

20 Claims, 7 Drawing Sheets

PROVISION OF INPUT/OUTPUT CLASSIFICATION IN A STORAGE SYSTEM

FIELD

Embodiments of the present disclosure generally relate to the field of storage systems, and more particularly, to techniques for input/output (I/O) classification in a distributed cloud storage system.

BACKGROUND

Virtual disk images are generally enabled through scale-out distributed cloud storage systems, which may be open source or proprietary systems. These systems typically provide block storage services for their tenants, such as cloud-based storage facilities and accompanying services. The quality of service (QoS) parameters provided by these systems, such as caching, workload fingerprinting, runtime, time between accesses to a file, number of accesses to a file, or the like may vary and may need to be improved in order to achieve better I/O quality of service.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
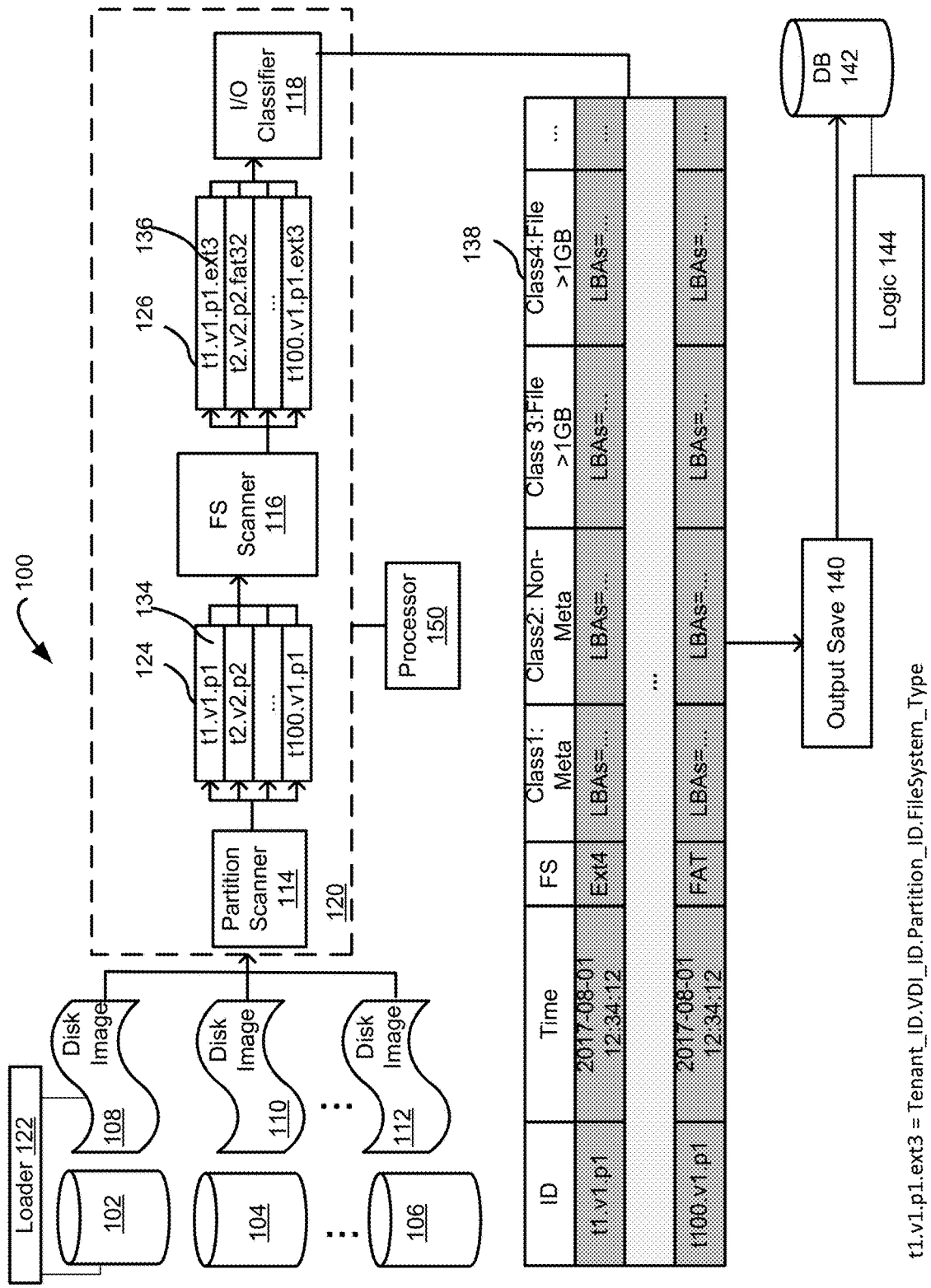
FIG. 1 illustrates an example computing environment that is adapted to provide I/O classification information associated with a virtual disk, in accordance with some embodiments.

Embodiments of the present disclosure describe techniques and configurations for an apparatus configured to provide I/O classification information in a distributed cloud storage system. In embodiments, the apparatus may include a partition scanner, to scan an image of a virtual disk associated with the storage system, to determine one or more partitions associated with the virtual disk; a file system scanner coupled with the partition scanner, to identify file systems associated with the determined partitions, to access files stored in the identified file systems; and I/O classifier coupled with the file system scanner, to generate I/O classification information associated with the accessed files. The I/O classification information provides characteristics of input-output operations performed on the virtual disk.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

FIG. 1 illustrates an example computing environment that is adapted to provide I/O classification information associated with a virtual disk, in accordance with some embodiments. In embodiments, the computing environment 100 may be a distributed cloud storage system having one or more virtual disk storage devices 102, 104, 106. Examples of distributed cloud storage systems include, but are not limited to, Ceph® Storage System, Red Hat Cluster Suite®, Apache Hadoop Distributed File System (HDFS)®, Amazon Wireless Services Elastic Block Storage®, Alibaba Cloud Pangu®, or the like. These and other distributed cloud storage systems enable provisioning of virtual disk images (VDI), e.g., VDI 108 of the virtual disk 102, VDI 110 of the virtual disk 104, and VDI 112 of the virtual disk 106. Virtual disks 102, 104, 106 and their respective VDI 108, 110, 112 are shown in FIG. 1 for purposes of illustration; it is understood that the cloud storage system 100 may have any number of virtual disks and their respective virtual images.

The embodiments described herein provide for obtaining I/O classification information associated with different types of memory block input-output operations on the virtual disks for the multi-tenant cloud storage systems. According to the embodiments described herein, the VDI analysis process is performed to build an I/O classification profile for the tenants' virtual machines (VMs) accessing the VDIs. The I/O classification for distributed cloud storage system may be obtained online (when VMs are running) or offline (when VMs are not running). The classification provides insights of whereabouts for different types of I/O based, for example, on their logic block addresses (LBA). The exact types of I/O, or I/O classes, are based on file system metadata scanning per individual file system driver. The process can be concurrently performed for multiple tenant VDIs without tenants' participation. The resulting I/O classification can be directly used as I/O hints to perform I/O caching, or prefetching, or workload fingerprinting, to help improve tenants' I/O performance.

For example, the presence of specific files and the storage traffic directed to them may provide a fingerprint for the supported workload that can be used to inform optimization parameters. For instance, the presence of large, frequently-read EDB (Exchange Database) files on an NTFS VDI containing common Microsoft® Windows executable files could be used to identify the guest as an Exchange Email server. In a similar fashion, the presence of frequently accessed .mdf files in a "Microsoft SQL Server" directory tree could identify the VM as a Database server for which different optimizations may be appropriate. The contents of specific files on the virtual disk provide indications of the operating system, release, etc., that can provide hints as to storage and other optimizations that will benefit the guest (e.g., the contents of the /etc/*release* file, the kernels present on the disk, or the like).

The described embodiments also allow a cloud service provider to exploit optimization opportunities to maintain some desired service level agreements (SLA) at a lower cost, e.g., through more-effective use of tiered storage. As described below, optimizations based on file classification information offer large performance boosts, e.g., up to a double. Currently, the cloud service providers (CSPs) are typically unable to get this information because customers do not install the special kernels and drivers that may provide such information. The embodiments described herein allow CSPs to get the cost and performance improvements without imposing any requirements on their customers. Leveraging this approach should yield significant performance improvements or cost savings to the CSPs.

The described embodiments provide advantages relative to conventional systems in the following aspects. For example, the embodiments described herein provide for low development overhead, because all tools involved in VDI scanning are commonly available. The described techniques are highly scalable, because the VDI scans can be conducted in parallel and concurrently for as many as tenants' virtual disk images. Even greater parallelism can be achieved by distributing work by smaller components (e.g., by partition or by file system subtree).

Further, the described embodiments provide for resource efficiency because the scan is mostly I/O bound, and may not cost many extra CPU cycles. Also, the described embodiments provide virtually no impact on tenant being online or offline because the scan can be invoked when the tenant is online or offline, or can be scheduled based on tenant usage and administrator choice. In one embodiment, guest-initiated data transfers are processed (extracting relevant metadata as the guest accesses the virtual disk. Yet further, the described embodiments do not necessitate tenant opt-in requirements. The described techniques can work with any system software stack without requiring any specific enabling in operating systems.

Existing solutions do not currently use virtual disk image scanning for I/O classification provided in the embodiments described herein. The described embodiments benefit from the scale-out nature of distributed storage systems, and can be deployed into existing distributed storage systems without much effort.

The described embodiments leverage the following observations. For example, virtual disk image formats are fairly well known. Commonly known virtual disk image formats include, but are not limited to, open source Quick Emulator (QEMU) Copy on Write (QCOW), VMWare Virtual Machine Disk (vmdk), Oracle® VirtualBox Virtual Disk Image (vdi), Microsoft® Virtual Hard Disk (vhd), and the like. The disk images formats can be converted from one to another. For ease of explanation virtual disk image file format is used herein as a common term referencing existing formats. More specifically, the virtual disk image may act as a container of the underlying partition of an individual file system, similar to how file systems reside in a physical disk. With a known existing virtual disk image format, it is possible to find out the file system where the collection of classification of, e.g., metadata vs data, can occur.

Further, VDI may be accessed from the cloud storage. VDI are exposed to tenant as a virtual hard disk via a choice of the virtual I/O controller (e.g. Integrated Drive Electronics (IDE), Serial ATA (SATA), or Small Computer System Interface (SCSI)). At the same time, VDI comprise regular object files in the backend distributed storage with metadata to track the allocation of actual blocks of storage. Accordingly, virtual disk images can be accessed via read-only capability, without impacting the tenant activities.

Also, the virtual disk image can be mounted with the file system driver or it can be scanned for file system metadata information with the corresponding file system tool. Accordingly, file system information of a given VDI can be accessed and analyzed or stored for future use.

In embodiments, the I/O classification information is obtained by scanning an image of a virtual disk, analyzing the scan results to obtain I/O classification information, and providing (e.g., storing) the obtained I/O classification information for future use by the cloud computing system. In some embodiments, a virtual disk may be comprised of one or more physical disks or partitions. In some embodiments, a virtual disk may comprise a collection of files in a file system. For example, in the case with iSCSI servers, a virtual disk may comprise one or more physical disks or partitions, rather than a collection of files. As noted above, the I/O classification information associated with virtual disks may be used to achieve better I/O quality of service for the cloud storage system tenants, to enable techniques such as I/O hint based caching, workload fingerprinting, or the like.

Specifically, with reference to FIG. 1, obtaining the I/O classification information may be performed by a component 120 of the computing environment 100. In embodiments, the component 120 includes a partition scanner 114 configured to scan VDI to determine existing partitions of the virtual disk. The component 120 further includes a file system scanner 116 configured to scan files stored in the determined partitions of the virtual disk, to identify file systems associated with the stored files. The component 120 further includes an I/O classifier 118 configured to generate I/O classification information associated with the stored files, based on the identified file systems associated with the stored files.

In embodiments, the component 120 may include a loader (e.g., VDI driver) 122, configured to retrieve the VDI from the distributed cloud system. It is understood that VDI is comprised of regular files from operating system (OS) perspective, so they may be retrieved by the storage system that provides the file access interface. The example storage systems include Portable Operating System Interface (POSIX) or object storage. To enable VDI to be presented to VM as a virtual disk, VDI drivers translate the corresponding VDI image format to a disk I/O (e.g., virtual disk I/O). For example, in Linux® QEMU has drivers to access VDI as Ceph RBD (object storage) or as a file. In Oracle® VirtualBox, the VirtualBox virtual machine manager (VMM) software provides similar drivers to support their VDI format. Similar drivers/loaders exist in EMC VMWare®.

In embodiments, the component 120 may be implemented in software, firmware, hardware, or a combination thereof. For example, the component 120 with partition scanner 114, file system scanner 116, I/O classifier 118, and loader 122 may be implemented as software executable on the processor 150. In other embodiments, some or all of the components 114, 116, and/or 118 of the component 120 may be implemented in firmware or hardware solutions. For example, as described below, the components 114, 116, and 118 may be implemented on a memory controller, a memory driver provided in an operated system, a server (e.g., file system server), a file system tool, and so on.

In operation, the component 120 retrieves the virtual disk image (e.g., VDI 108 of the virtual disk 102), e.g., via corresponding application program interface (API) of the distributed cloud storage system (e.g., environment 100). For example, a read-only snapshot of the VDI may be automatically generated when the virtual disk load occurs. In embodiments, the loader 122 may be configured to retrieve the VDI file.

The partition scanner 114 performs a disk partition scan for the given retrieved VDI (e.g., 108), and builds a list of existing partitions 124. As shown, the list of partitions may include characteristics (e.g., t1.v1.p1 associated with partition 134, as shown). Here, t1.v1.p1, is a tuple as an example notation that may be adopted (e.g., by CSP) to help identify the individual target partition to be scanned for I/O classification. In this notation, 't1' stands for Tenant_1, 'v1' as VDI_1, and 'p1' stands 'Partition_1'. This means we are targeting the scanning for Tenant_1's virtual disk image 'VDI_1', where inside, the first partition 'Partition_1.

The file system scanner 116 retrieves the file system type information, and invokes a file system level scan, for a given partition of the retrieved VDI, in order to identify file systems associated with the stored files. The result of the file level system scan is a file system type list 126. For example, for the partition 134, the list 126 may include characteristics 136, e.g., t1.v1.p1.ext3, wherein ext3 is a file extension indicating the file system type.

Based on the file system scan, the I/O classifier 118 performs I/O classification. The generated I/O classification data output may include, but are not limited to, file system level metadata, e.g., total blocks, total blocks allocated, total number of files, etc.; locations (LBAs) of file system metadata and non-metadata; per file metadata, such as time stamps, size, access control list (ACL); and the like. The file type can be inferred from the file name or file name extension, e.g., .doc vs .mp3. Also, regular file or executable file including library files can be identified by the header identification. In embodiments, the per-data block type may be identified, for example, by computing the entropy as an indication of the block type. This may be accomplished by retrieving the per block data, in addition to a retrieval of the per block metadata.

More specifically, as shown in FIG. 1, the I/O classification data output 138 may include the partition identifier (ID) (e.g., t1.v1.p1), time of scan (e.g., 2017-08-01 12:34:12), file system (FS) (e.g., Ext4), and classes. The classes may include, but are not limited to: Class 1 Meta (with corresponding LBA), Class 2 Non-Meta (with corresponding LBA), Class 3 File (>1 GB, with corresponding LBA), Class 4 File (>1 GB, with corresponding LBA), and so on. It is understood that the term "class" may mean type, category, group, etc., that needs to be labeled or tagged as similar for the sake of I/O classification. For example, in data caching, it needs to be determined what data is to cache and what data is not to cache. It also needs to be determined what similar data belongs to the class or category that should be cached (or not cached). In some embodiments class information is associated with one or more LBAs. In some embodiments class representation is stored in a more-processed form (e.g., intermediate details may be used in processing but the final priority class may be maintained across a collection of LBAs).

The collected I/O classification data output is saved (140) and stored, e.g., to a persistent storage or database 142 for later use, e.g. by processing logic 144. Each record in the database 142 may be prefixed with a timestamp, tenant identification, VDI identification, partition identification, and the like.

In general, the output of the VDI scanning can be stored in various ways for subsequent data mining or statistical analysis. For example, the I/O classification data output may be stored as a separate file. A separate file may be created corresponding to the invocation of a scan for a given VDI image. The captured features from scanning may be written to the file. The filename can be prefixed with the corresponding VDI image name and suffixed by timestamp. This example requires a separate storage location for the I/O classification data files. To keep time series scanning data, the output can be appended to the target file for the given VDI, with timestamp captured for that scan. In some embodiments, classification may be generated dynamically and stored in a non-persistent memory structure.

In another example, the I/O classification data output may be stored as a database. Each scan for a given VDI at a given timestamp is recorded as a database row data corresponding to that VDI for that time, as shown in FIG. 1. Each row is a collection of the features from the scanning for a given VDI at the given timestamp. This example is data-mining friendly since there are many existing tools to perform query and statistical analysis on such databases. With a column as timestamp of scan, the time series data can be stored quite easily. A database, such as SQLite® or MySQL®, normally comes with features configured to easy maintenance such as back up, replication or truncation.

In yet another example, the I/O classification data output may be stored in-line with the VDI. Every VDI has a header to keep some metadata information that not related to the actual raw blocks. The header can be extended to include the VDI scanning outputs. In the example of the in-line VDI storage, the data output from the most recent scan can be kept, while history scanning outputs can be discarded.

In general, for I/O classification, the VDI scanning can capture useful information, as briefly described in reference to FIG. 1. Exact output of the scanning might be dependent on the actual implementation. For example, useful key features associated with the VDI can be captured in I/O classification information, and applied to different usage scenarios. These features may be divided into two categories, as static and dynamic features, where static features can be obtained via offline VDI scanning, and dynamic features may be obtained from VDI while online, with assistance from guest operating system (OS) driver/daemon services. In some embodiments, VDI contents are accessed via Hypervisor (virtual machine monitor (VMM)) interfaces.

In some such embodiments the Hypervisor provides additional data to relate multiple disks assigned to the same guest. In some embodiments access to VDI contents is performed through Hypervisor interfaces, allowing access to disk contents that might be challenged by encryption of other processing in the data handling path. In some embodiments, the Hypervisor provides access to storage commands or data from guest storage accesses, enabling online processing without requiring additional software to be installed or executed within the guest. In some embodiments, data read and write requests to the storage system are classified according to the VDI targeted by the storage system accesses. In these embodiments online processing is enabled by monitoring storage requests, associating them with the appropriate VDI and making use of the command and data streams as needed, without requiring additional software to be installed within the guest or Hypervisor.

In some embodiments, classification is made based on state that has been committed to virtual disk. In such embodiments, state may differ from state as perceived by executing guest software (e.g., for data which is cached in memory but has not yet been persisted). As classification information is used to alter performance characteristics (such as caching, placement or the like) rather than to alter functionality, occasional errors due to the lack of in-guest perspectives is acceptable. Table 1 provides some example feature that may be captured by VDI scanning.

using a variety of online or offline approaches. Processing may be done online or offline. In processing file system tools (e.g., fsck) may be applied to deal with errors. Consistency-management approaches (e.g., checkpointing) or retries may be utilized to deal with changes made during online processing.

If the desired I/O information is located in the Hypervisor, a hypercall is needed to get the information. If the desired I/O information is located in the header, it can be accessed by a file system accessor. For efficiency, the metadata provided by the VDI scan enables sophisticated VDI run-time-profiling, as statistics can be associated with the corresponding file instead of random LBAs. This can provide for filtered profiling, e.g., restricting data collection to key file types or hot files. It also allows for memory savings, as statistics can be associated with a file rather than a block. In other words, memory footprint can be reduced by restricting the scanning on a per file basis (hot files), rather than individual blocks.

Figure 2:
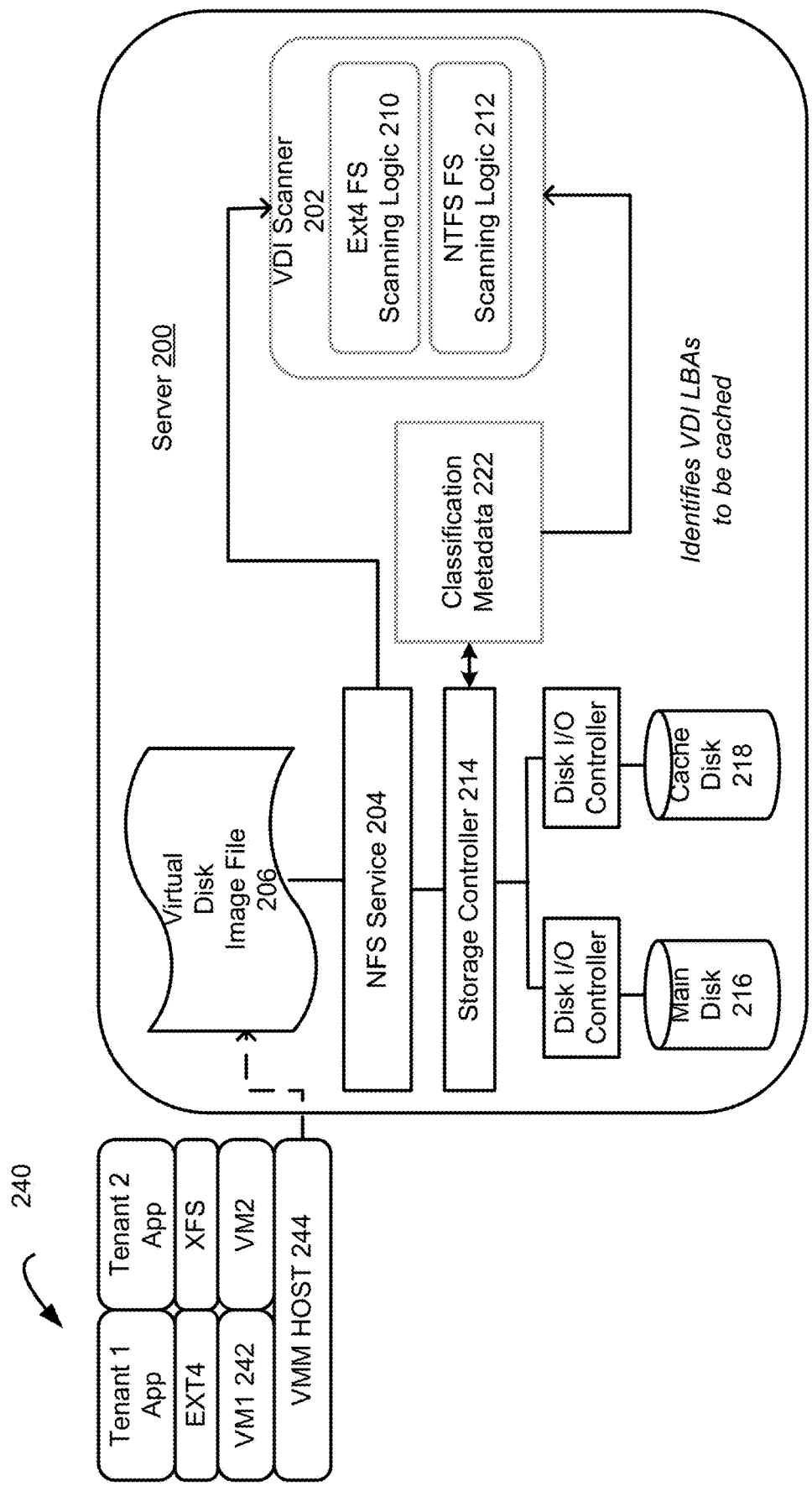
FIGS. 2-4 illustrate example computing environments in which the I/O classification information provision may be implemented, in accordance with some embodiments.
Figure 3:
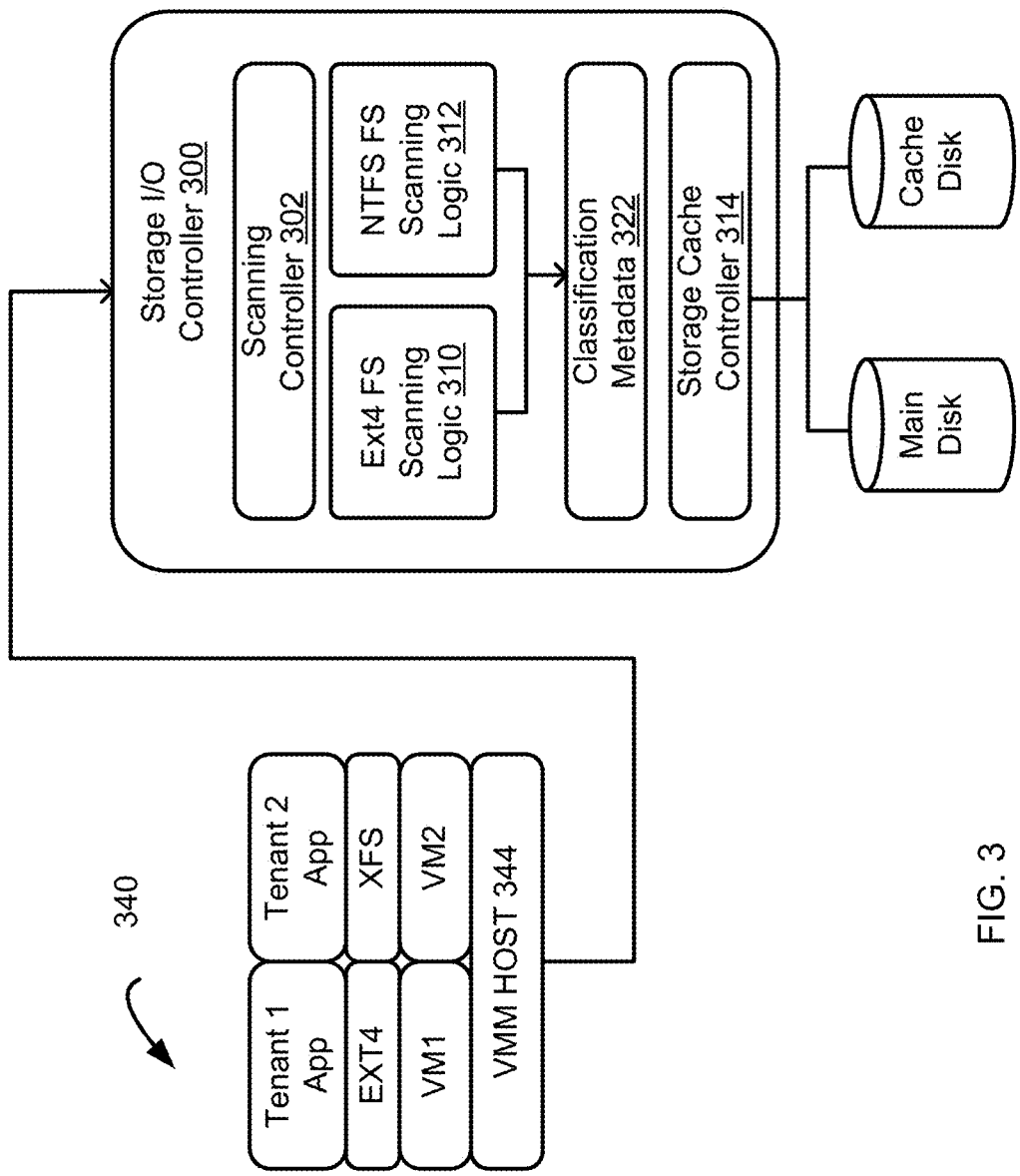
Figure 4:
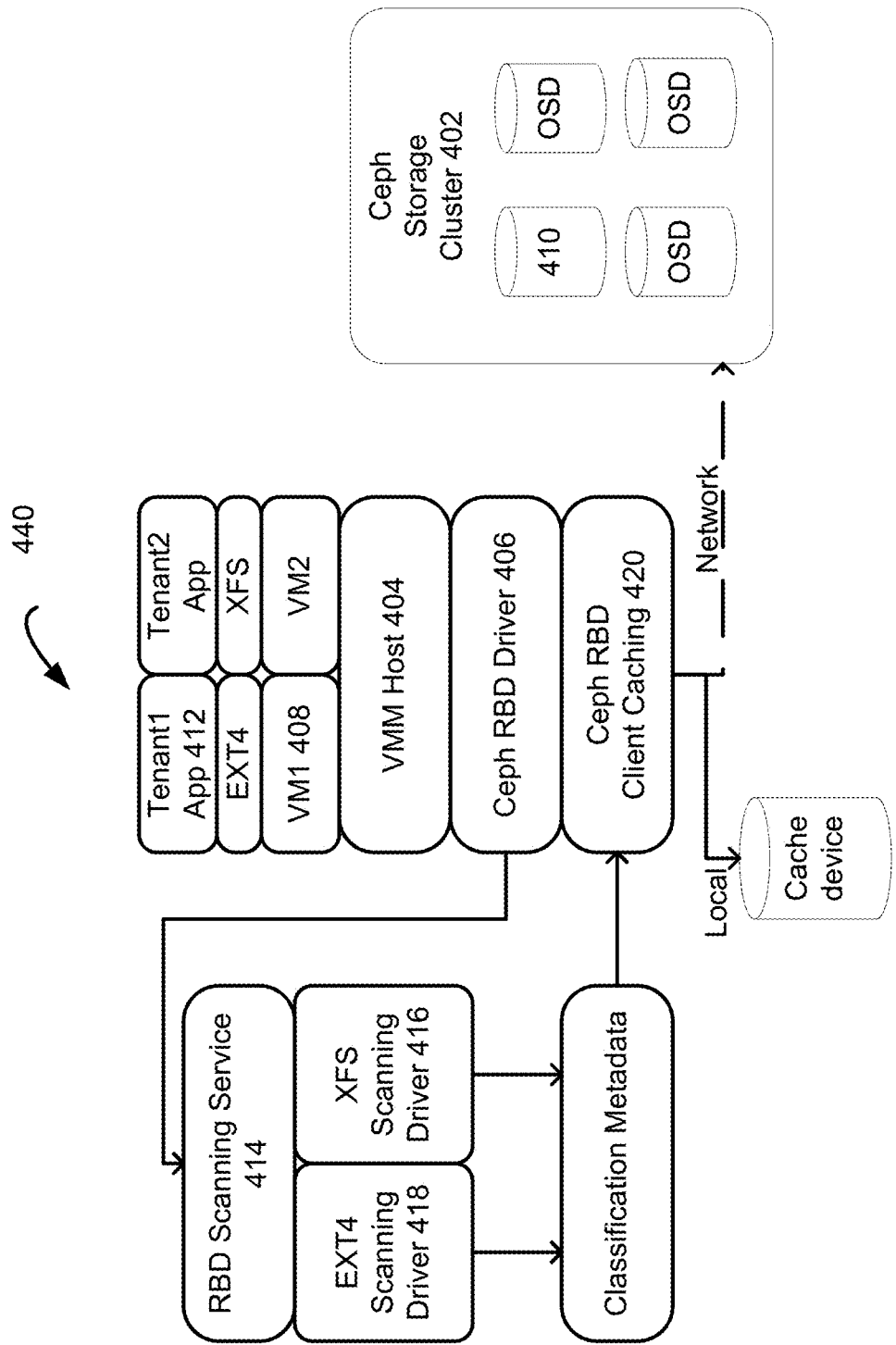

Depending on the structure of the distributed cloud systems and, more particularly, on the VDI host implementations, there are several potential ways of applying the embodiments of the present disclosure in different storage environments, as described in reference to FIGS. 2-4.

FIGS. 2-4 illustrate example computing environments in which the I/O classification information provision may be implemented, in accordance with some embodiments.

In some embodiments, I/O classification information provision may be implemented as part of a general file server, if VDI is provided over a general file server. For example, for a VDI with Linux Ext4 in a QEMU qcow2 (QEMU copy-on-write version 2) image on a Network File System (NFS) server, the process of obtaining I/O classification information can be applied as a service from the NFS server.

FIG. 2 illustrates an example computing environment, in which VDI is provided over a general file server 200, and I/O classification information provision is implemented on the server 200. In embodiments, the server 200 may be a NFS server, Internet Small Computer Systems Interface (iSCSI) server, or the like. At least some of the components

TABLE 1

| Names | Description | How to obtain |
|---|---|---|
| Type | Indicates if the LBA (or LBA range) is a boot sector, file system metadata, or data blocks | Offline, e.g., for Linux ® such information can be obtained via file system API, FIEMAP, etc. |
| Content | Indicates the LBA (or LBA ranges or a file) contain known data types such as document, image, video, etc. | Offline, e.g., via file name or utility such as Linux command line tool "file" |
| Access Frequency | Indicates how many times the LBA (or LBA range or a file) has been accessed since last time. This can be for both read and write. For file write, this can also be further differentiated as overwrite, truncate, or append. This also indicates hot, warm, or cold LBAs (or LBA ranges) | Offline, but require guest OS or Hypervisor support to monitor LBA access activities, such as a block of file system filter driver, or Quick Emulator (QEMU) block driver. |

As shown in Table 1, the I/O classification features may be captured through VDI scanning that can be potentially very useful for statistical analysis for the purpose of accelerating VDI performance. It will be understood that other metrics, such as average write velocity per LBA, average time-between-different-types-of-access or other metrics can be extended to the table. For access, fields for hot LBAs can be added and a standardized place for keeping the I/O classification information can be created. It will be apparent to one skilled in the art that feature sets can be extracted of FIG. 2 correspond to respective components described in reference to FIG. 1 (e.g., VDI scanner, VDI, and the like).

As shown in FIG. 2, on the server 200, the service 204 (e.g., NFS service or iSCSI service) satisfies requests from the server client 240, such as returning data from read requests, updating files responding to write requests or the like. The VDI 206, e.g., corresponding to the virtual disk for VM1 242, is stored on the server 200. Accesses to the virtual disk by Tenant 1 are intercepted by the VMM 244 and redirected to the VDI 206 stored on the server 200.

In some embodiments, the service 204 is enhanced beyond the basic functionality present in conventional systems, to include a VDI scanner 202 (similar to the component 102 of FIG. 1), which processes the contents of VDI files. The VDI scanner 202 (e.g., Ext4 FS scanning logic 210 similar to FS scanner 116 of FIG. 1) implements the partitions scanning and interprets the file's contents as a block device, processing the data to determine the file system in use. Once the file system is determined, appropriate scanning logic (e.g., New Technology File System (NTFS) FS scanning logic 212 similar to I/O classifier 118 of FIG. 1) is invoked to identify file system metadata, and the sizes and types of the various files within the VDI, as described in reference to FIG. 1.

The VDI scanner 202 may also identify VDI-specific metadata that should also be favored for caching. This classification metadata 222 is stored and made available for the use by the storage controller 214. The storage controller 214 may use this metadata to determine appropriate placement and caching for VDI content, for example, for placing latency-sensitive data on the fastest devices (e.g., main disk 216) or caching resources (cache 218).

For example, VM1 242 may be a Linux® guest using an Ext4 root file system that is stored as a partition on the virtual disk, which may be stored (e.g., in a .qcow image) on the server 200. Service 204 is the NFS service that provides for identification of a file, with an extension name .qcow. It is known that "qcow" stands for QEMU Copy of Write, in a VDI image format. Accordingly, this VDI on NFS can be accessed via the service 204 to perform the VDI scanning logic 202 to scan the actual file system behind or contained inside. Partition information may be provided as a part of VDI scanning. For example, the information may be provided in a form of a table containing the partition type and corresponding identification (e.g., magic number, Globally Unique Identifier' (GUID) etc.). Ext4 FS scanning logic 210 may be invoked to determine blocks with file system metadata as well as to classify the logical blocks according to the type of file they contain.

In some embodiments, updates to files on the virtual disk are monitored by the service 204 and classification and caching decisions are updated dynamically as a consequence of these updates. In some embodiments, the service 204 performs virtual disk inspection and placement and/or policy updates periodically, or in an offline optimization phase.

As noted, the above provides a similar scenario for an iSCSI storage server. The iSCSI storage volume may be accessed by the VMM to store an arbitrary virtual disk image. Alternatively, an iSCSI device can be assigned to an iSCSI controller and directly accessed by a virtualized or non-virtualized compute client.

In embodiments, the provision of the I/O classification information may be offloaded to a storage controller, when the storage controller is configured to access memory blocks from the target tenant VDI. For example, for a VDI with Linux® Ext4 in a QEMU qcow2 on a disk, the storage controller hardware or firmware can perform the VDI scanning functionality described above.

FIG. 3 illustrates an example computing environment, in which the provision of the I/O classification information is implemented on a storage controller. As shown, a storage controller 300 includes a scanning controller 302, Ext4 scanning logic 310 (similar to 210 of FIG. 2) and NTFS FS scanning logic 312 (similar to 212 of FIG. 2). The client 340's VMM 344 stores virtual disk images for VM1 and VM2 on the file system maintained by the VMM from the storage controller.

In some embodiments, the scanning controller 302 is configured to look in standard locations to identify partition and file system information. The scanning controller 302 invokes file system specific scanning logic (e.g., 310 for Linux® Ext4 and/or 312 for Windows® NTFS) to process each identified file system, and generates I/O classification information metadata 322 for the files contained therein. This metadata 322 is provided to the cache controller 314, which uses it to determine which blocks to cache.

In some embodiments, accesses to virtual disk are tracked to determine per-classification hit/miss rates. In some embodiments, the cache controller adjusts the cache allocation per class, or the cache allocation between VMs based on the cache statistics gathered.

In some embodiments, usage statistics are applied to identify whether a given VDI file is in use, or the file activity rate to determine caching resources to apply. In some embodiments, the cache controller 314 and policy engine are provided with quality-of-service inputs to determine how caching resources should be applied across different VDIs. In some embodiments, classification information may include a snapshot identifier, so that data relevant to a specific snapshot or set of snapshots may be prioritized for caching. In embodiments, VDI scanning provided by the storage controller 300 can be used in virtualized or non-virtualized systems.

In embodiments, the provision of the I/O classification information may be provided as part of cloud storage VDI service. For example, for VDI with Linux® Ext4 file system from Ceph® Reliable Autonomic Distributed Object Store (RADOS) Block Device (RBD), a software module (e.g., based on Ceph® Lua dynamic class) can provide full Ext4 metadata scanning and I/O classification service for the tenant of the cloud computing system. As understood, file system metadata is the bookkeeping information typically associated with each file within a file system. Ext4 metadata is such metadata for files in Ext4 filesystem.

FIG. 4 illustrates an example computing environment 440, in which the provision of the I/O classification information is implemented as a part of cloud service. The example assumes Red Hat Ceph® as the cloud storage where VDI files are stored in the format known as Ceph® RBD (Ceph® RADOS Block Device).

The Ceph® storage cluster 402 would satisfy requests from Ceph® RBD client (i.e., the VMM Host 404 with Ceph® RBD Driver 406 in FIG. 4), such as, for example, returning data from read requests and updating files responding to write requests. As shown in FIG. 4, the VDI corresponding to the virtual disk image for VM1 408 is stored as a Ceph® RBD file 410 on the Ceph® storage cluster 410. Accesses to the virtual disk by Tenant 1 app 412 are intercepted by the VMM Host 404 and redirected via Ceph® RBD driver 406 to the Ceph® RBD VDI file 410 stored on the Ceph® storage cluster 402.

In some embodiments, the Ceph® RBD Driver 406 is enhanced beyond the basic functionality present in conventional systems, to include a Ceph® RBD VDI Scanning Service 414, which is configured to process the contents of VDI as Ceph® RBD files. The Ceph® RBD Scanning Service 414 is a VDI scanner that is configured to interpret the file's contents as a block device, processing the data to determine the file system in use. Once the file system is determined, appropriate scanning logic is invoked to identify file system metadata, and the sizes and types of the various files within the Ceph® RBD VDI. The output of the Ceph® RBD VDI Scanning Service 414 is fed (e.g., through one or more scanning drivers 416, 418) to a storage cache controller, i.e. the Ceph® RBD Client Caching 420, to accelerate the I/O for VM1 408 of Tenant1 App 412, for example, by placing latency-sensitive data on the fastest devices or caching resources.

For example, VM1 408 in FIG. 4 is identified as a Linux® VM using an EXT4 file system in VM1's VDI file stored as Ceph® RBD VDI file 410 on Ceph® storage cluster 402. In this case, the Ceph® RBD driver 406 would identify VM1's Ceph® RBD VDI file to the Ceph® RBD VDI scanner 414. The scanner 414 would examine the partition table and identify the presence of an Ext4 partition. Ext4 scanning logic (driver 418) would be invoked to determine blocks with file system metadata as well as to classify the logical blocks according to the type of file they contain. In some embodiments, the Ceph® RBD scanning service 414 for Ceph® RBD VDI can be built as a Ceph® dynamic class object and integrated with Ceph® RBD driver 406. The described embodiments illustrate just one example of implementation of techniques described herein on Red Hat Ceph® cloud storage system. In general, the described techniques can be applied to any distributed cloud storage system. In other words, individual CSP can apply the described techniques on top of their own cloud storage technology.

The following provides an example of how to apply the embodiments of this disclosure in storage caching using the scanned I/O classification information output to help accelerate tenants' requests to cloud storage services. In the example below, without loss of generality, caching acceleration software and a solid state drive (SSD) can be used as a caching device to automatically cache important data blocks for tenants.

system. The process 500 may comport with actions described in connection with FIGS. 1-4 in some embodiments. The process 500 may apply to provision of I/O classification information in accordance with embodiments described herein. For example, in embodiments, the process 500 may be performed by a memory controller, a server, or a computing device coupled with or a part of a distributed storage cloud system.

At block 502, the process 500 includes scanning an image of a virtual disk, to determine one or more partitions associated with the virtual disk.

At block 504, the process 500 includes identifying file systems associated with determined partitions of the virtual disk, to access files stored in the identified file systems.

At block 506, the process 500 includes generating I/O classification information associated with the stored files and/or LBAs of the virtual disk, based at least in part on the stored files. The I/O classification information provides characteristics of input-output operations performed on the virtual disk.

In embodiments, the process 500 may also include retrieving and storing the image of the virtual disk, where the virtual disk image is to be used for the generation of the I/O classification information.

Various operations of the process 500 are described as multiple discrete operations, in a manner that is most helpful in understanding the claimed subject matter. It will be appreciated that the sequence of operations associated with the process 600 may vary and/or include other actions in accordance with the present disclosure.

TABLE 2

| Tenants | VDI OS FS Type | Tenant Operation | Feature Used from VDI Scan Output | Suggested Optimization Based on VDI Scanning Output |
|---|---|---|---|---|
| Tenant 1 | Linux Ext4 | Locate a given file, e.g., find - name 'foo' | FS metadata blocks | For storage blocks corresponding to the FS metadata blocks of the VDI (1) preload these blocks into cache to warm it up before guest VM boots (2) always cache these blocks (do not evict) |
| Tenant 2 | Windows NTFS | Viewing image files | Files that are identified as images | Cache all data blocks belonging to any file identified as an image file |
| Tenant 3 | Linux Ext4 | Unknown | Access Frequency | (1) Cache all blocks with a read frequency > m times/hour; (2) Do not cache any blocks that has a write frequency > n times/hour |

As shown in Table 2, Tenant 1 is performing a file system crawl. Accordingly, it would be beneficial to cache all metadata of the file system, which can be based on the feature "type" to indicate whether an LBA is or LBA ranges are file system metadata or not. For Tenant 2, the operation is viewing images. Accordingly, it could be helpful if only image files were cached. For Tenant 3, the operation is not defined. Therefore, the access frequency can be used to cache those blocks that are frequently being read, but not those that are frequently being written. The above provides but an example of applying scanning outputs for storage caching. In summary, the embodiments of this disclosure provide for automation of caching policy for different tenants based on VDI scanning, to accelerate file system metadata access.

Figure 5:
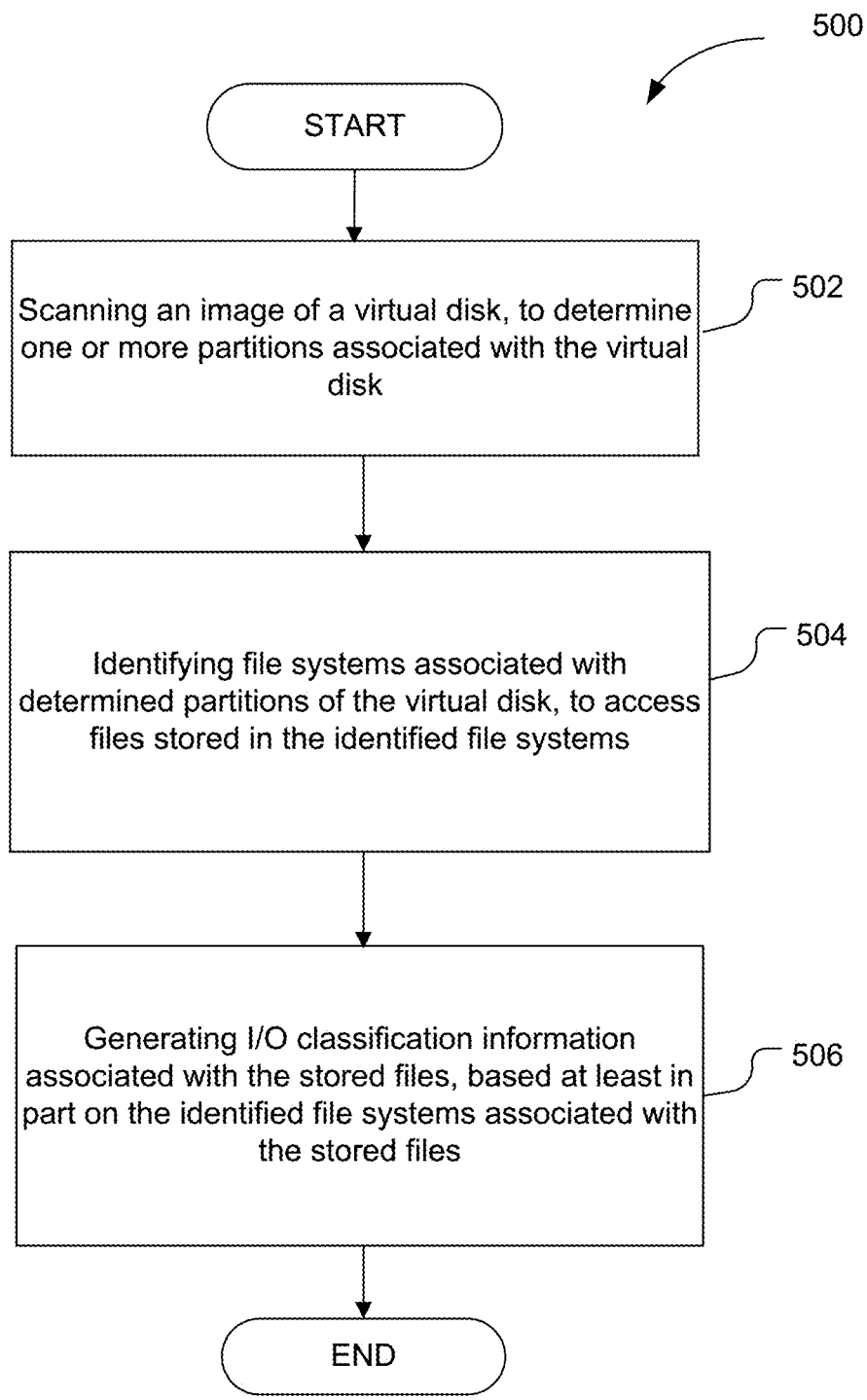
FIG. 5 is an example process flow diagram for providing I/O classification information in a distributed cloud storage system.

FIG. 5 is an example process flow diagram for providing I/O classification information in a distributed cloud storage The memory devices and methods described herein may be implemented into a system using any suitable hardware and/or software to configure as desired.

Figure 6:
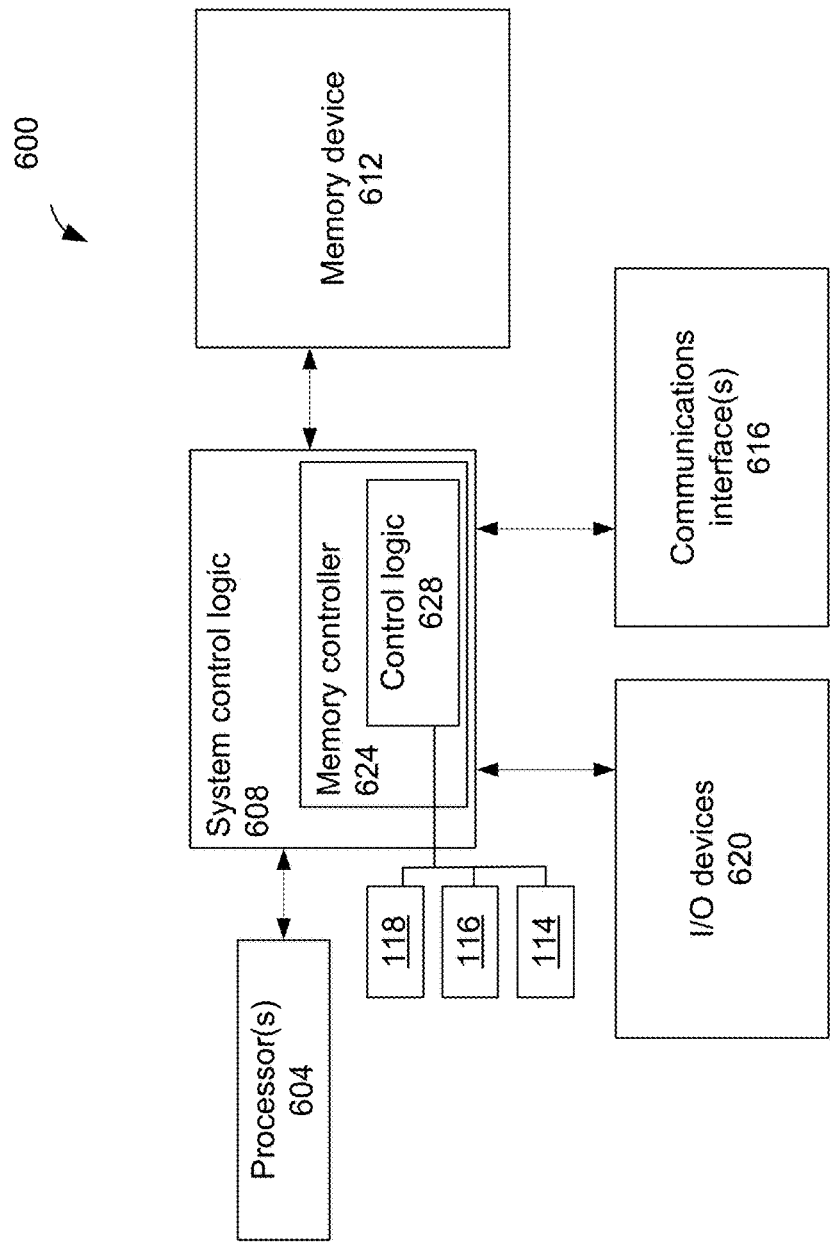
FIG. 6 schematically illustrates an example computing device configured with provisioning of I/O classification information, in accordance with some embodiments.

FIG. 6 schematically illustrates an example computing device configured with provisioning of I/O classification information, in accordance with some embodiments. The computing device 600 includes system control logic 608 coupled to one or more processor(s) 604; a memory device 612; one or more communications interface(s) 616; and input/output (I/O) devices 620.

The memory device 612 may be a non-volatile computer storage chip. In embodiments, the memory device 612 comprises a package, driver circuitry (e.g., drivers), input/output connections to electrically couple the memory device 612 with other components of the computing device 600, etc. The memory device 612 may be configured to be removably or permanently coupled with the computing device 600. In some embodiments, the memory device 612 may be implemented as a virtual disk as described in reference to FIGS. 1-5.

Communications interface(s) 616 may provide an interface for computing device 600 to communicate over one or more network(s) and/or with any other suitable device, e.g., in a distributed cloud storage computing environment described in reference to FIGS. 1-5. Communications interface(s) 616 may include any suitable hardware and/or firmware. Communications interface(s) 616 for one embodiment may include, for example, a network adapter, a wireless network adapter, a telephone modem, and/or a wireless modem. For wireless communications, communications interface(s) 616 for one embodiment may use one or more antennas to communicatively couple the computing device 600 with a wireless network.

For one embodiment, at least one of the processor(s) 604 may be packaged together with logic for one or more controller(s) of system control logic 608. For one embodiment, at least one of the processor(s) 604 may be packaged together with logic for one or more controllers of system control logic 608 to form a System in Package (SiP). For one embodiment, at least one of the processor(s) 604 may be integrated on the same die with logic for one or more controller(s) of system control logic 608. For one embodiment, at least one of the processor(s) 604 may be integrated on the same die with logic for one or more controller(s) of system control logic 608 to form a System on Chip (SoC).

System control logic 608 for one embodiment may include any suitable interface controllers to provide for any suitable interface to at least one of the processor(s) 604 and/or to any suitable device or component in communication with system control logic 608. The system control logic 608 may move data into and/or out of the various components of the computing device 600.

System control logic 608 for one embodiment may include a memory controller 624 to provide an interface to the memory device 612 to control various memory access operations. The memory controller 624 may include control logic 628 that may be specifically configured to control access of the memory device 612. In embodiments, the control logic 628 may include the partition scanner 114, FS scanner 116, and I/O classifier 118 described in reference to FIG. 1.

In various embodiments, the I/O devices 620 may include user interfaces designed to enable user interaction with the computing device 600, peripheral component interfaces designed to enable peripheral component interaction with the computing device 600, and/or sensors designed to determine environmental conditions and/or location information related to the computing device 600.

In various embodiments, the user interfaces could include, but are not limited to, a display, e.g., a liquid crystal display, a touch screen display, etc., a speaker, a microphone, one or more digital cameras to capture pictures and/or video, a flashlight (e.g., a light emitting diode flash), and a keyboard.

In various embodiments, the peripheral component interfaces may include, but are not limited to, a non-volatile memory port, an audio jack, and a power supply interface. In various embodiments, the sensors may include, but are not limited to, a gyro sensor, an accelerometer, a proximity sensor, an ambient light sensor, and a positioning unit. The positioning unit may additionally/alternatively be part of, or interact with, the communication interface(s) 616 to communicate with components of a positioning network, e.g., a global positioning system (GPS) satellite.

In various embodiments, the computing device 600 may be a server; a laptop computing device, a tablet computing device, a netbook, a smartphone, etc.; a desktop computing device; a workstation; etc. The computing device 600 may have more or fewer components, and/or different architectures. In further implementations, the computing device 600 may be any other electronic device that processes data.

Figure 7:
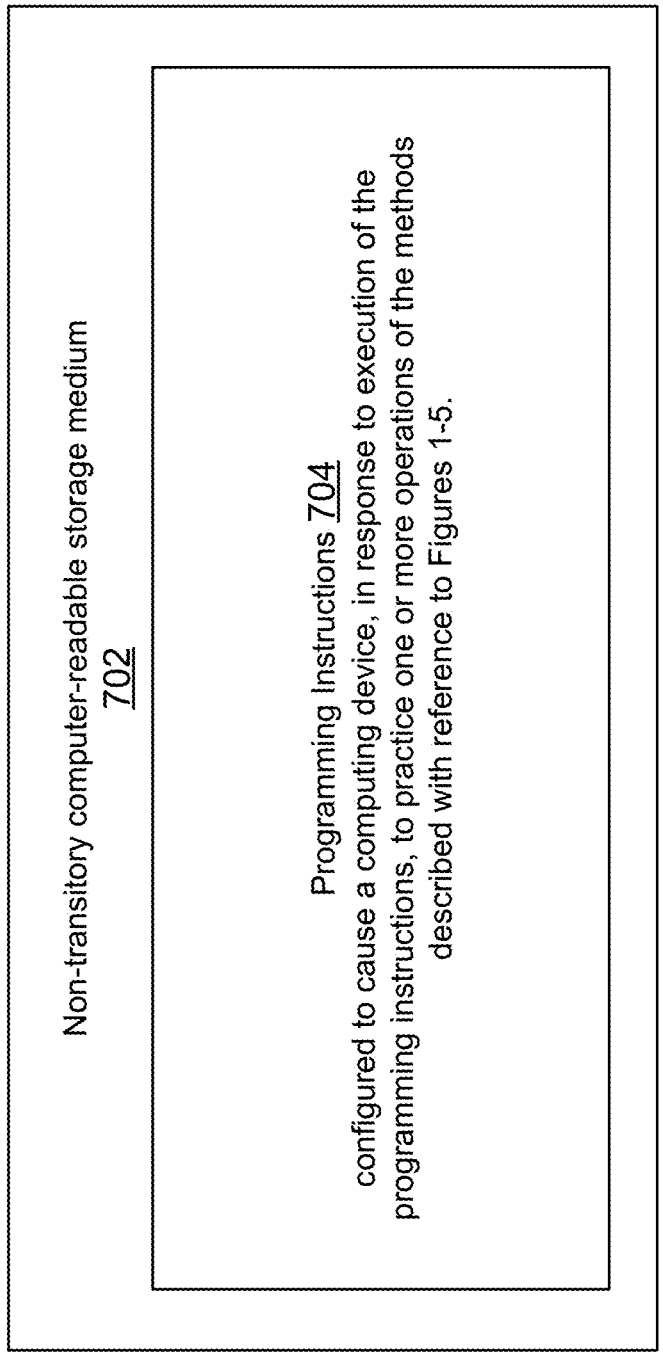
FIG. 7 illustrates an example computer-readable storage medium having instructions configured to perform some or all operations described in reference to FIGS. 1-5, in accordance with some embodiments.

FIG. 7 illustrates an example computing device-readable storage medium having instructions configured to perform some or all operations described in reference to FIGS. 1-5, in accordance with some embodiments. More specifically, the instructions may comprise commands to perform operations described in reference to components 122, 114, 116, and/or 118 of FIG. 1, or corresponding components described in reference to FIGS. 2-4, such as 204, 206, 214, 222, 202, 210, 212, 242 and 244 of FIG. 2, or 300, 302, 310, 312, 322, 314, 340, and 344 of FIG. 3, or 402, 404, 406, 420, 414, 416, 418, 420 of FIG. 4, or instructions provided in blocks 502, 504, 506 of FIG. 5, for example. The instructions stored on the computing device-readable medium 702 may be executed, for example, on the processor(s) 604 of the computing device 600 of FIG. 6. The computing-device storage medium 702 may be implemented in, or be accessible by, the control logic 628 of FIG. 6.

As illustrated, computing device-readable storage medium 702 may include the executable code of a number of programming instructions or bit streams 704. Executable code of programming instructions (or bit streams) 704 may be configured to enable a device, e.g., computing device 600, in response to execution of the executable code/programming instructions to perform (aspects of) processes performed by partition scanner 114, FS scanner 116, and I/O classifier 118, or corresponding components described in reference to FIGS. 2-5. In alternate embodiments, executable code/programming instructions/bit streams 704 may be disposed on multiple non-transitory computing device-readable storage medium 702 instead. In embodiments, computing device-readable storage medium 702 may be non-transitory. In still other embodiments, executable code/programming instructions 704 may be encoded in transitory computer readable medium, such as signals.

According to various embodiments, the present disclosure describes a number of examples.

Example 1 is an apparatus, comprising: a partition scanner, to scan an image of a virtual disk, to determine one or more partitions associated with the virtual disk; a file system scanner coupled with the partition scanner, to identify file systems associated with the determined one or more partitions, to access files stored in the identified file systems; and input-output (I/O) classifier coupled with the file system scanner, to generate I/O classification information associated with the accessed files, wherein the I/O classification information provides expected characteristics of input-output operations performed on the virtual disk.

Example 2 includes the subject matter of Example 1, wherein the I/O classification information includes one or more of: file system level metadata, logic block addresses (LBA) associated with the file system metadata or non-metadata, metadata associated with respective files, or per data block type.

Example 3 includes the subject matter of Example 2, wherein the file system level metadata includes one or more of: a total number of memory blocks, a total number of allocated memory blocks, or a total number of stored files.

Example 4 includes the subject matter of Example 1, further comprising a loader coupled with the partition scanner, to retrieve and store the image of the virtual disk, wherein the virtual disk image is to be used for the generation of the I/O classification information.

Example 5 includes the subject matter of Example 4, wherein the apparatus is to store the I/O classification information in a file that is to be generated in association with the retrieved image of the virtual disk.

Example 6 includes the subject matter of Example 4, wherein the apparatus is to store the I/O classification information in a database, in association with the retrieved image of the virtual disk.

Example 7 includes the subject matter of Example 4, wherein the apparatus is to store the I/O classification information in-line with the retrieved image of the virtual disk.

Example 8 includes the subject matter of Example 1, wherein the apparatus comprises a file server.

Example 9 includes the subject matter of Example 1, wherein the apparatus comprises a storage controller.

Example 10 includes the subject matter of any of Examples 1 to 9, wherein the apparatus comprises a cloud storage service, coupled with a distributed cloud storage system, wherein the distributed cloud storage system includes the virtual disk.

Example 11 is a non-transitory computing device-readable storage media having instructions stored thereon that, in response to execution by a computing device, cause the computing device to: scan, an image of a virtual disk, to determine one or more partitions associated with the virtual disk; identify file systems associated with the determined partitions of the virtual disk, to access files stored in the identified file systems; and generate input-output (I/O) classification information associated with the accessed files, wherein the I/O classification information provides characteristics of input-output operations performed on the virtual disk.

Example 12 includes the subject matter of Example 11, wherein the I/O classification information includes one or more of: file system level metadata, logic block addresses (LBA) associated with the file system metadata or non-metadata, metadata associated with respective files, or per data block type.

Example 13 includes the subject matter of Example 11, wherein the instructions further cause the computing device to retrieve and store the image of the virtual disk, wherein the virtual disk image is to be used for the generation of the I/O classification information.

Example 14 includes the subject matter of Example 13, wherein the instructions further cause the computing device to store the I/O classification information in a file that is to be generated in association with the retrieved image of the virtual disk.

Example 15 includes the subject matter of Example 13, wherein the instructions further cause the computing device to store the I/O classification information in a database, in association with the retrieved image of the virtual disk, or to store the I/O classification information in-line with the retrieved image of the virtual disk.

Example 16 is a computer-implemented method, comprising: scanning, by a computing device, an image of a virtual disk, to determine one or more partitions associated with the virtual disk; identifying, by the computing device, file systems associated with the determined partitions, to access files stored in the identified file systems; and generating, by the computing device, input-output (I/O) classification information associated with the accessed files, wherein the I/O classification information provides characteristics of input-output operations performed on the virtual disk.

Example 17 includes the subject matter of Example 16, further comprising: retrieving and storing, by the computing device, the image of the virtual disk, wherein the virtual disk image is to be used for the generation of the IO classification information.

Example 18 includes the subject matter of Example 17, wherein the storing includes: storing, by the computing device, the I/O classification information in a file that is to be generated in association with the retrieved image of the virtual disk; storing, by the computing device, the I/O classification information in a database, in association with the retrieved image of the virtual disk; or storing, by the computing device, the I/O classification information in-line with the retrieved image of the virtual disk Example 19 includes the subject matter of any of Examples 16 to 18, wherein the computing device comprises a file server.

Example 20 includes the subject matter of Example 19, wherein the computing device comprises a storage controller.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to specific implementations disclosed in the specification and the claims. Rather, the scope is to be determined entirely by the following claims, which are to be construed in accordance with established doctrines of claim interpretation.

What is claimed is:

1. An apparatus, comprising:
    a computing device including a processor and a memory coupled with the processor; and
    a partition scanner operated by the computing device, to scan an image of a virtual disk, to determine one or more partitions associated with the virtual disk;
    a file system scanner coupled with the partition scanner and operated by the computing device, to identify file systems associated with the determined one or more partitions, to access files stored in the identified file systems; and
    an input-output (I/O) classifier coupled with the file system scanner and operated by the computing device, to generate I/O classification information associated with the accessed files, wherein the I/O classification information provides expected characteristics of input-output operations performed on the virtual disk.

2. The apparatus of claim 1, wherein the I/O classification information includes one or more of: file system level metadata, logic block addresses (LBA) associated with the file system level metadata or non-metadata, metadata associated with respective files, or per data block type.

3. The apparatus of claim 2, wherein the file system level metadata includes one or more of: a total number of memory blocks, a total number of allocated memory blocks, or a total number of stored files.

4. The apparatus of claim 1, further comprising a loader coupled with the partition scanner, to retrieve and store the image of the virtual disk, wherein the virtual disk image is to be used for the generation of the I/O classification information.

5. The apparatus of claim 4, wherein the apparatus is to store the I/O classification information in a file that is to be generated in association with the retrieved image of the virtual disk.

6. The apparatus of claim 4, wherein the apparatus is to store the I/O classification information in a database, in association with the retrieved image of the virtual disk.

7. The apparatus of claim 4, wherein the apparatus is to store the I/O classification information in-line with the retrieved image of the virtual disk.

8. The apparatus of claim 1, wherein the apparatus comprises a file server.

9. The apparatus of claim 1, wherein the apparatus comprises a storage controller.

10. The apparatus of claim 1, wherein the apparatus comprises a cloud storage service, coupled with a distributed cloud storage system, wherein the distributed cloud storage system includes the virtual disk.

11. A non-transitory computing device-readable storage media having instructions stored thereon that, in response to execution by a computing device, cause the computing device to:
scan an image of a virtual disk to determine one or more partitions associated with the virtual disk;
identify file systems associated with the one or more determined partitions of the virtual disk, to access files stored in the identified file systems; and
generate input-output (I/O) classification information associated with the accessed files, wherein the I/O classification information provides characteristics of input-output operations performed on the virtual disk.

12. The non-transitory computing device-readable storage media of claim 11, wherein the I/O classification information includes one or more of: file system level metadata, logic block addresses (LBA) associated with the file system level metadata or non-metadata, metadata associated with respective files, or per data block type.

13. The non-transitory computing device-readable storage media of claim 11, wherein the instructions further cause the computing device to retrieve and store the image of the virtual disk, wherein the virtual disk image is to be used for the generation of the I/O classification information.

14. The non-transitory computing device-readable storage media of claim 13, wherein the instructions further cause the computing device to store the I/O classification information in a file that is to be generated in association with the retrieved image of the virtual disk.

15. The non-transitory computing device-readable storage media of claim 13, wherein the instructions further cause the computing device to store the I/O classification information in a database, in association with the retrieved image of the virtual disk, or to store the I/O classification information in-line with the retrieved image of the virtual disk.

16. A computer-implemented method, comprising:
scanning, by a computing device, an image of a virtual disk, to determine one or more partitions associated with the virtual disk;
identifying, by the computing device, file systems associated with the determined one or more partitions, to access files stored in the identified file systems; and
generating, by the computing device, input-output (I/O) classification information associated with the accessed files, wherein the I/O classification information provides characteristics of input-output operations performed on the virtual disk.

17. The computer-implemented method of claim 16, further comprising:
retrieving and storing, by the computing device, the image of the virtual disk, wherein the virtual disk image is to be used for the generation of the I/O classification information.

18. The computer-implemented method of claim 17, wherein the storing includes:
storing, by the computing device, the I/O classification information in a file that is to be generated in association with the retrieved image of the virtual disk;
storing, by the computing device, the I/O classification information in a database, in association with the retrieved image of the virtual disk; or
storing, by the computing device, the I/O classification information in-line with the retrieved image of the virtual disk.

19. The computer-implemented method of claim 16, wherein the computing device comprises a file server.

20. The computer-implemented method of claim 16, wherein the computing device comprises a storage controller.

* * * * *